(12) United States Patent
Peleg et al.

(10) Patent No.: US 12,125,504 B2
(45) Date of Patent: *Oct. 22, 2024

(54) METHOD AND SYSTEM FOR AUTOMATIC PRE-RECORDATION VIDEO REDACTION OF OBJECTS

(71) Applicant: BriefCam Ltd., Modiin (IL)

(72) Inventors: Shmuel Peleg, Modiin (IL); Elhanan Hayim Elboher, Modiin (IL); Ariel Naim, Modiin (IL)

(73) Assignee: BriefCam Ltd., Modiin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,500

(22) Filed: May 13, 2024

(65) Prior Publication Data

US 2024/0296873 A1     Sep. 5, 2024

Related U.S. Application Data

(63) Continuation of application No. 17/973,542, filed on Oct. 26, 2022, now Pat. No. 11,984,141, which is a
(Continued)

(51) Int. Cl.
    *G11B 27/36*        (2006.01)
    *G06F 16/783*     (2019.01)
    (Continued)

(52) U.S. Cl.
    CPC ........ *G11B 27/036* (2013.01); *G06F 16/7837* (2019.01); *G06V 10/255* (2022.01);
    (Continued)

(58) Field of Classification Search
    USPC ....................................................... 386/287
    See application file for complete search history.

(56) References Cited

U.S. PATENT DOCUMENTS

| 5,457,769 | A  | 10/1995 | Valley |
| 6,321,194 | B1 | 11/2001 | Berestesky |

(Continued)

FOREIGN PATENT DOCUMENTS

| DE | 102017109106 A1 | 12/2017 |
| EP | 3043329 A2 | 7/2016 |

(Continued)

OTHER PUBLICATIONS

A. Bedagkar-Gala and S. K. Shah, "A survey of approaches and trends in person re-identification," Image and Vision Computing, vol. 32, No. 4, pp. 270-286, 2014.

(Continued)

*Primary Examiner* — Nigar Chowdhury
(74) *Attorney, Agent, or Firm* — PEARL COHEN ZEDEK LATZER BARATZ LLP

(57) ABSTRACT

A system and a method for automatic video redaction are provided herein. The method may include: receiving, an input video comprising a sequence of frames captured by a camera, wherein the input video includes live video obtained directly from the camera, wherein recordation of the video directly from the camera is disabled; performing visual analysis of the input video, to detect portions of the frames of the input video in which one of a plurality of predefined objects or a descriptor thereof is detected; generating a redacted input video by replacing the portions of the frames with new portions of another visual content; and recording the redacted input video on a data storage device, wherein the generating of the redacted input video, is carried out by a computer processor, after the input video is captured by the camera and before the recording of the redacted input video on the data storage device.

20 Claims, 9 Drawing Sheets

Related U.S. Application Data continuation of application No. 16/670,657, filed on Oct. 31, 2019, now Pat. No. 11,527,265.

(60) Provisional application No. 62/902,414, filed on Sep. 19, 2019, provisional application No. 62/795,056, filed on Jan. 22, 2019, provisional application No. 62/772,726, filed on Nov. 29, 2018, provisional application No. 62/754,769, filed on Nov. 2, 2018.

(51) Int. Cl.
| | |
|---|---|
| *G06V 10/20* | (2022.01) |
| *G06V 10/764* | (2022.01) |
| *G06V 10/82* | (2022.01) |
| *G06V 20/40* | (2022.01) |
| *G11B 27/034* | (2006.01) |
| *G11B 27/036* | (2006.01) |
| *G11B 27/34* | (2006.01) |

(52) U.S. Cl.
CPC .......... *G06V 10/764* (2022.01); *G06V 10/82* (2022.01); *G06V 20/46* (2022.01); *G11B 27/034* (2013.01); *G11B 27/34* (2013.01)

(56) References Cited

U.S. PATENT DOCUMENTS

| | | | |
|---|---|---|---|
| 6,757,027 B1 | 6/2004 | Edwards | |
| 7,200,555 B1 | 4/2007 | Ballard | |
| 7,283,962 B2 | 10/2007 | Meyerhoff | |
| 7,440,594 B2 | 10/2008 | Takenaka | |
| 8,102,406 B2 | 1/2012 | Peleg | |
| 8,621,251 B1 | 12/2013 | Keller et al. | |
| 8,743,222 B2 | 6/2014 | Hamalainen | |
| 8,819,014 B2 | 8/2014 | Roenning et al. | |
| 8,843,953 B1 | 9/2014 | Dang et al. | |
| 9,431,006 B2 | 8/2016 | Bellegarda | |
| 9,431,029 B2 | 8/2016 | Yook | |
| 9,472,196 B1 | 10/2016 | Wang | |
| 9,574,671 B1 | 2/2017 | Amberg et al. | |
| 9,612,791 B2 | 4/2017 | Yi | |
| 9,619,854 B1 | 4/2017 | Sharifi | |
| 9,693,023 B2 | 6/2017 | Fujii | |
| 9,697,822 B1 | 7/2017 | Naik | |
| 9,996,939 B2 | 6/2018 | Huang | |
| 10,008,240 B2 | 6/2018 | Koide | |
| 10,026,448 B2 | 7/2018 | Koide | |
| 10,102,850 B1 | 10/2018 | Basye | |
| 10,163,027 B2 | 12/2018 | Yano | |
| 10,210,410 B2 | 2/2019 | Schueren | |
| 10,249,055 B2 | 4/2019 | Adachi | |
| 10,303,950 B1 | 5/2019 | Bedi | |
| 10,311,913 B1 | 6/2019 | Shekhar et al. | |
| 10,324,583 B2 | 6/2019 | Jiang | |
| 10,324,892 B2* | 6/2019 | Burshteyn | H04L 63/0428 |
| 10,447,966 B2 | 10/2019 | Ritchey | |
| 10,476,922 B2 | 11/2019 | Edwards | |
| 10,481,860 B2* | 11/2019 | Johnson | H04M 1/72403 |
| 10,534,525 B1 | 1/2020 | Suchland | |
| 10,547,679 B1 | 1/2020 | Burnett et al. | |
| 10,671,665 B2 | 6/2020 | Paris | |
| 10,785,530 B2 | 9/2020 | Cremer | |
| 10,810,657 B2 | 10/2020 | Rice | |
| 10,827,235 B2 | 11/2020 | Tang et al. | |
| 11,327,526 B2 | 5/2022 | Reeves et al. | |
| 2002/0097380 A1 | 7/2002 | Moulton | |
| 2003/0204569 A1 | 10/2003 | Andrews | |
| 2004/0076330 A1 | 4/2004 | Sloan | |
| 2005/0091407 A1 | 4/2005 | Vaziri | |
| 2006/0034260 A1 | 2/2006 | Svedberg | |
| 2006/0128411 A1 | 6/2006 | Turcanu | |
| 2006/0239471 A1 | 10/2006 | Mao | |
| 2007/0002035 A1 | 1/2007 | Plut | |
| 2007/0118374 A1 | 5/2007 | Wise | |
| 2007/0136741 A1 | 6/2007 | Stattenfield | |
| 2008/0075269 A1 | 3/2008 | Raifel | |
| 2008/0177975 A1 | 7/2008 | Kawamura | |
| 2008/0231712 A1 | 9/2008 | Frink et al. | |
| 2009/0000355 A1 | 1/2009 | Emerson et al. | |
| 2009/0030693 A1 | 1/2009 | Shaffer | |
| 2009/0083063 A1 | 3/2009 | Johnson | |
| 2009/0097386 A1 | 4/2009 | Miyauchi et al. | |
| 2009/0013117 A1 | 5/2009 | Pearce | |
| 2010/0016076 A1 | 1/2010 | Longdale | |
| 2010/0036663 A1 | 2/2010 | Rangarao | |
| 2010/0099400 A1 | 4/2010 | Lefeuvre | |
| 2010/0125452 A1 | 5/2010 | Sun | |
| 2010/0220891 A1 | 9/2010 | Lefevre | |
| 2010/0286987 A1 | 11/2010 | Han | |
| 2010/0332560 A1 | 12/2010 | Gerbasi, III | |
| 2011/0093343 A1 | 4/2011 | Hatami-Hanza | |
| 2011/0134914 A1 | 6/2011 | Wasiel | |
| 2011/0276799 A1 | 11/2011 | Chung | |
| 2011/0314094 A1 | 12/2011 | De Oliveira Antunes | |
| 2011/0320865 A1 | 12/2011 | Jain et al. | |
| 2012/0001725 A1 | 1/2012 | Tirasiriku et al. | |
| 2012/0013937 A1 | 1/2012 | Ashmore | |
| 2012/0086785 A1 | 4/2012 | Valin et al. | |
| 2013/0195428 A1 | 8/2013 | Marks | |
| 2013/0343584 A1 | 12/2013 | Bennett | |
| 2013/0343729 A1* | 12/2013 | Rav-Acha | G06F 16/532 386/285 |
| 2013/0346588 A1* | 12/2013 | Zhang | H04L 67/535 709/224 |
| 2014/0007154 A1* | 1/2014 | Seibold | H04N 21/454 725/25 |
| 2014/0115472 A1 | 4/2014 | Mochinaga et al. | |
| 2014/0129225 A1 | 5/2014 | Nair | |
| 2014/0149264 A1 | 5/2014 | Satyanarayana | |
| 2014/0368602 A1 | 12/2014 | Woodgate et al. | |
| 2015/0002674 A1 | 1/2015 | Kleve et al. | |
| 2015/0199872 A1 | 7/2015 | George | |
| 2015/0235110 A1 | 8/2015 | Curtis | |
| 2015/0302867 A1 | 10/2015 | Tomlin | |
| 2015/0310878 A1 | 10/2015 | Bronakowski | |
| 2015/0316990 A1 | 11/2015 | Pacheco | |
| 2015/0380054 A1 | 12/2015 | Vilermo | |
| 2016/0005437 A1 | 1/2016 | Barry | |
| 2016/0034704 A1 | 2/2016 | Shim et al. | |
| 2016/0092561 A1 | 3/2016 | Liu et al. | |
| 2016/0358312 A1 | 12/2016 | Kolb, V | |
| 2016/0364397 A1 | 12/2016 | Lindner | |
| 2016/0372154 A1 | 12/2016 | Moncomble | |
| 2017/0053446 A1 | 2/2017 | Chen et al. | |
| 2017/0078718 A1 | 3/2017 | Ioffe | |
| 2017/0092297 A1 | 3/2017 | Sainath | |
| 2017/0104928 A1 | 4/2017 | Chase et al. | |
| 2017/0109122 A1 | 4/2017 | Schmidt et al. | |
| 2017/0171286 A1 | 6/2017 | Coste et al. | |
| 2017/0178287 A1 | 6/2017 | Anderson | |
| 2017/0217462 A1 | 8/2017 | West et al. | |
| 2017/0270970 A1 | 9/2017 | Ho et al. | |
| 2017/0337912 A1 | 11/2017 | Caligor et al. | |
| 2018/0005500 A1 | 1/2018 | Robertson et al. | |
| 2018/0027880 A1 | 2/2018 | Dong | |
| 2018/0033151 A1 | 2/2018 | Matsumoto | |
| 2018/0068423 A1 | 3/2018 | Adachi | |
| 2018/0122033 A1 | 5/2018 | Mayuzumi | |
| 2018/0152662 A1 | 5/2018 | Takahashi et al. | |
| 2018/0196587 A1 | 7/2018 | Bialynicka-Birula | |
| 2018/0218234 A1 | 8/2018 | Engineer | |
| 2018/0240472 A1 | 8/2018 | Vickers | |
| 2018/0268240 A1 | 9/2018 | Loce | |
| 2018/0277017 A1 | 9/2018 | Cheung | |
| 2018/0308524 A1 | 10/2018 | Muyal et al. | |
| 2018/0336716 A1 | 11/2018 | Ramprashad | |
| 2018/0359410 A1 | 12/2018 | Ain-Kedem et al. | |
| 2018/0359477 A1 | 12/2018 | Yang | |
| 2018/0367868 A1 | 12/2018 | Banger | |
| 2019/0012793 A1 | 1/2019 | Ito | |
| 2019/0020914 A1 | 1/2019 | Zhang et al. | |
| 2019/0042871 A1 | 2/2019 | Pogorelik | |
| 2019/0073813 A1 | 3/2019 | Ito | |

(56) References Cited

U.S. PATENT DOCUMENTS

| | | |
|---|---|---|
| 2019/0086599 A1 | 3/2019 | Meng |
| 2019/0089910 A1 | 3/2019 | Banik |
| 2019/0095467 A1 | 3/2019 | Kislyuk |
| 2019/0096438 A1 | 3/2019 | Shafir Nir |
| 2019/0108735 A1 | 4/2019 | Xu |
| 2019/0139308 A1 | 5/2019 | Sun |
| 2019/0141298 A1 | 5/2019 | Vaidya et al. |
| 2019/0147598 A1 | 5/2019 | Sawai |
| 2019/0213429 A1 | 7/2019 | Sicconi |
| 2019/0222718 A1 | 7/2019 | Sawai |
| 2019/0236791 A1 | 8/2019 | Matsui |
| 2019/0246048 A1 | 8/2019 | Matsui |
| 2019/0287513 A1 | 9/2019 | Alameh |
| 2019/0313071 A1 | 10/2019 | Chen et al. |
| 2019/0355172 A1 | 11/2019 | Dsouza et al. |
| 2019/0392107 A1* | 12/2019 | Ricci .................. G06F 21/44 |
| 2020/0146097 A1 | 5/2020 | Haartsen |
| 2020/0152215 A1 | 5/2020 | Tsuji |
| 2023/0046913 A1 | 2/2023 | Peleg et al. |

FOREIGN PATENT DOCUMENTS

| | | |
|---|---|---|
| EP | 3319045 A1 | 5/2018 |
| JP | 2005277786 A | 10/2005 |
| JP | 2005277856 A | 10/2005 |
| JP | 4756357 B2 | 8/2011 |
| JP | 5159381 B2 | 3/2013 |
| JP | 5408156 B2 | 2/2014 |
| JP | 2017046196 A | 3/2017 |
| JP | 2017188771 A | 10/2017 |
| JP | 2018112991 A | 7/2018 |
| WO | WO-2006/021943 A1 | 3/2006 |
| WO | WO-2018/088608 A1 | 5/2018 |

OTHER PUBLICATIONS

A. Ephrat, I. Mosseri, O. Lang, T. Dekel, K. Wilson, A. Hassidim, W.T. Freeman, and M. Rubinstein, Looking to Listen at the Cocktail Party: A Speaker-Independent Audio-Visual Model for Speech Separation , SIGGRAPH 2018.

A. Gabbay, A. Shamir, and S. Peleg, Visual Speech Enhancement, Interspeech'18, Hyderabad, Sep. 2018, pp. 1170-1174.

A. Rav-Acha, Y. Pritch, and S. Peleg, "Making a long video short: Dynamic video synopsis," in CVPR, 2006, pp. 435-441.

A. Sehgal and N Kehtarnavaz, A Convolutional Neural Network Smartphone App for Real-Time Voice Activity Detection, IEEE Access, 2018.

A.J. Simpson, G. Roma, and M.D. Plumbley, Deep Karaoke: Extracting Vocals from Musical Mixtures Using a Convolutional Deep Neural Network. arXiv:1504.04658, 2015.

B. Mcfee, J. Salamon, and J. P. Bello, Adaptive pooling operators for weakly labeled sound event detection, IEEE/ACM Trans. on Audio, Speech and Language Processing. 26(11): 2180-2193, Nov. 2018.

Boddapati, Venkatesh, Classifying environmental sounds using image recognition networks, Science Direct, International Conference on Knowledge Based and Intelligent Information and Engineering Systems, KES2017, Sep. 6-8, 2017, Marseille, France, Downloaded Jan. 23, 2019. https://www.sciencedirect.com/science/article/pii/S1877050917316599.

D.A. Reynolds, An overview of automatic speaker recognition technology, ICASSP, 2002.

Freesound General-Purpose Audio Tagging Challenge, 2019 Kaggle Inc, Downloaded Jan. 23, 2019. https://www.kaggle.com/c/freesound-audio-tagging.

G. Ben-Artzi, M. Werman, and S. Peleg, Event Retrieval Using Motion Barcodes , ICIP'15, Quebec City, Sep. 2015, pp. 2621-2625.

G. Ben-Artzi, Y. Kasten, S. Peleg, and M. Werman, Camera Calibration from Dynamic Silhouettes Using Motion Barcodes, CVPR'16, Las Vegas, Jun. 2016, pp. 4095-4103.

Geitgey, Adam; Machine Learning is Fun Part 6: How to do Speech Recognition with Deep Learning; Dec. 24, 2016. Downloaded Nov. 11, 2019. https://medium.com/@ageitgey/machine-learning-is-fun-part-6-how-to-do-speech-recognition-with-deep-learning-28293c162f7a.

I. Ofodile et al., Automatic Recognition of Deceptive Facial Expressions of Emotion , arXiv 1707.04061 (2017).

I. Potamitis, N. Fakotakis and G. Kokkinakis, Gender-dependent and speaker-dependent speech enhancement , IEEE ICASSP, FL, 2002, pp. I-249-I-252.

Ido Ariav, David Dov, and Israel Cohen, A deep architecture for audio-visual voice activity detection in the presence of transients, Signal Processing, 2018.

International Search Report and Written Opinion for PCT Application No. PCT/IL2019/051198,mailed on Feb. 26, 2020.

J. Salamon and J. P. Bello, Deep Convolutional Neural Networks and Data Augmentation For Environmental Sound Classification, IEEE Signal Processing Letters, 24(3), pp. 279-283, 2017.

J.S. Chung, A. Nagrani, and A. Zisserman, VoxCeleb2: Deep Speaker Recognition, Interspeech 2018 and arXiv:1806.05622.

K. He, G. Gkioxari, P. Dollar, and R. Girshick, "Mask r-cnn," in Computer Vision (ICCV), 2017 IEEE International Conference on. IEEE, 2017, pp. 2980-2988.

Karol J. Piczak, Environmental Sound Classification With Convolutional Neural Networks, 2015 IEEE International Workshop on Machine Learning for Signal Processing, Sep. 17-20, 2015, Boston, USA https://www.semanticscholar.org/paper/Environmental-sound-classification-with-neural-Piczak/0e39e519471cc41b23281bd529542e2c02f21fa.

Kim, Ricky, Urban Sound Classification—Part 1: sound wave, digital audio signal, Jun. 24, 2018. Downloaded Jan. 23, 2019. https://towardsdatascience.com/urban-sound-classification-part-1-99137c6335f9.

M. Daisy, D. Tschumperle and O. Lezoray "A Fast Spatial Patch Blending Algorithm for Artefact Reduction in Pattern-based Image Inpainting". In SIGGRAPH Asia 2013 Technical Briefs. ACM, 2013, pp. 8:1-8:4.

M. McVicar, R. Santos-Rodriguez, and T. De Bie, Learning to separate vocals from.

M. Ravanelli and Y. Bengio, Speaker Recognition from Raw Waveform with SincNet, IEEE Spoken Language Technology Workshop, Dec. 2018, Athens, and arXiv:1808.00158.

Paul Ekman, Emotions Revealed: Understanding Faces and Feelings , Hachette UK, 2012.

Paul Ekman, Nonverbal Messages: Cracking the Code , Paul Ekman Group, 2016.

Polyphonic mixtures via ensemble methods and structured output prediction, 2016 IEEE, International Conference on Acoustics, Speech and Signal Processing (ICASSP). pp. 450-454, 2016.

Reconstructive NMF with spectrotemporal speech presence probabilities , Applied Acoustics, vol. 117, Part B, 2017, pp. 257-262.

S. Darabi, E. Shechtman, C. Barnes, D. B. Goldman, and P. Sen. "Image melding: combining inconsistent images using patch-based synthesis". ACM Trans. on Graphics, 31(4):82, 2012. 2, 3.

S. Gannot, E. Vincent, S. Markovich-Golan, A. Ozerov, A consolidated perspective on multi-microphone speech enhancement and source separation , IEEE/ACM Transactions on Audio, Speech and Language Processing, 2017, 25 (4), pp. 692-730.

S. Graf, T. Herbig, M. Buck, and G. Schmidt, Features for voice activity detection: a comparative analysis, EURASIP Journal on Advances in Signal Processing, Dec. 2015.

S. Lee, D.K. Han, and H. Ko, Single-channel speech enhancement method using reconstructive NMF with Spectro temporal speech presence probabilities, Applied Acoustics, vol. 117, Part B, 2017, pp. 257-262.

S. Ren, K. He, R. Girshick, and J. Sun, "Faster r-cnn: Towards real-time object detection with region proposal networks," in Advances in neural information processing systems, 2015, pp. 91-99.

Sanagapati, Pavan, Urban Sound Classification, 2019 Kaggle Inc. Downloaded Jan. 23, 2019. https://www.kaggle.com/pavansanagapati/urban-sound-classification.

(56) References Cited

OTHER PUBLICATIONS

Soni, Manik, AI which classifies Sounds: Code: Python, Hacker Noon, Jul. 29, 2018. Downloaded Jan. 23, 2019. https://hackernoon.com/ai-which-classifies-sounds-code-python-6a07a2043810.

Sound Classification with TensorFlow; IoT for All—Medium, Nov. 27, 2017; downloaded Nov. 11, 2019. https://medium.com/iotforall/sound-classification-with-tensorflow-8209bdb03dfb.

T. Halperin and M Werman, An Epipolar Line from a Single Pixel, WACV 2018.

T. Hughes and K. Mierle, "Recurrent neural networks for voice activity detection," 2013, IEEE International Conference on Acoustics, Speech and Signal Processing, Vancouver, BC, 2013, pp. 7378-7382.

Virtanen T., Plumbley M., Ellis D. (eds), Computational Analysis of Sound Scenes and Events, Springer, 2017.

Voice activity detection, Wikipedia, downloaded Jan. 23, 2019; http://en.wikipedia.org/wiki/Voice_activity_detection.

Voice Activity Detector System object; Detect presence of speech in audio signal—MATLAB—MathWorks, United Kingdom, Downloaded Jan. 23, 2019. https://www.mathworks.com/help/audio/ref/voiceactivitydetector-system-object.html.

W. Ayedi, H. Snoussi, and M. Abid, "A fast multi-scale covariance descriptor for object re-identification," Pattern Recognition Letters, vol. 33, No. 14, pp. 1902-1907, 2012. 14.

W. Choi, S. Kim, M. Keum, D. K. Han and H. Ko, Acoustic and visual signal based context awareness system for mobile application, IEEE Trans. Consumer Electronics, vol. 57, No. 2, pp. 738-746, May 2011.

W. Liu, D. Anguelov, D. Erhan, C. Szegedy, S. Reed, C.-Y. Fu, and A. C. Berg, "Ssd: Single shot multibox detector," in European conference on computer vision. Springer, 2016, pp. 21-37.

W. Luo, J. Xing, A. Milan, X. Zhang, W. Liu, X. Zhao, and T.-K. Kim, "Multiple object tracking: A literature review," arXiv preprint arXiv:1409.7618, 2014.

With Convolutional Neural Networks, 2015 IEEE International Workshop on Machine Learning for Signal Processing, Sep. 17-20, 2015, Boston, USA.

Wu, B. Singh, L.S. Davis, V.S. Subrahmanian, Deception Detection in Videos, arXiv:1712.04415, in AAAI 2018.

Y. Hoshen, R.J. Weiss, and K.W. Wilson, Speech Acoustic Modeling from Raw Multichannel Waveforms, ICASSP'15, Brisbane, Australia, Apr. 2015 Multichannel Waveforms, ICASSP'15, Brisbane, Australia, Apr. 2015.

Y. Matsushita, E. Ofek, W. Ge, X. Tang and H. Shum, Full-frame video stabilization with motion inpainting, in IEEE Trans. PAMI, vol. 28, No. 7, pp. 1150-1163, Jul. 2006.

Y. Poleg, A. Ephrat, S. Peleg. and C. Arora, Compact CNN for Indexing Egocentric Videos, IEEE Winter Conf. on Applications of Computer Vision (WACV'16), Mar. 2016.

Y. Wexler, E. Shechtman and M. Irani, Space-Time Completion of Video. In IEEE Transactions on Pattern Analysis and Machine Intelligence (PAMI), Mar. 2007.

Y.J. Lee and K. Grauman, Predicting Important Objects for Egocentric Video Summarization, Int. J. on Computer Vision, vol. 114, Issue 1, pp. 38-55, Aug. 2015.

Youness, Mansar, Audio Classi_cation: A Convolutional Neural Network Approach, Apr. 23, 2018. Downloaded Jan. 23, 2019 https://medium.com/@CVxTz/audio-classification-a-convolutional-neural-network-approach-b0a4fce8f6c.

\* cited by examiner

METHOD AND SYSTEM FOR AUTOMATIC PRE-RECORDATION VIDEO REDACTION OF OBJECTS

CROSS-REFERENCE TO RELATED APPLICATIONS

This application is a continuation of U.S. patent application Ser. No. 17/973,542, filed Oct. 26, 2022 which is a continuation of U.S. patent application Ser. No. 16/670,657, filed Oct. 31, 2019 which claims the benefit of U.S. Provisional Patent Application No. 62/754,769, filed Nov. 2, 2018, U.S. Provisional Patent Application No. 62/772,726, filed Nov. 29, 2018, U.S. Provisional Patent Application No. 62/795,056, filed Jan. 22, 2019 and U.S. Provisional Patent Application No. 62/902,414, filed Sep. 19, 2019, each of which is incorporated by reference herein in its entirety.

FIELD OF THE INVENTION

The present invention relates generally to the field of video and audio processing and, more particularly, to automatic object-aware video and audio editing.

BACKGROUND OF THE INVENTION

Prior to the background of the invention being set forth, it may be helpful to provide definitions of certain terms that will be used hereinafter.

The term "video redaction" and "audio redaction" as used herein is as the removal of at least some of the content of a video or audio respectively, usually but not necessarily, due to privacy reasons.

The term "object" as used herein is defined either as visual or acoustic appearance of a real-life object in a video, or as any descriptor of the object such as attributes or features associated with it. Thus, in the context discussed herein, while "object" is confined to the content of a video and sound, it may include both the data itself and the meta data describing it.

The term "similarity" or "similar" as used herein in the context of objects is defined as a level of similarity between two objects. Usually, but not necessarily, such measures are in some sense the inverse of distance metrics: they take on large values for similar objects and either zero or a negative value for very dissimilar objects.

Video cameras play an important role in keeping our daily lives safe. However, there are situations where cameras are not used due to resistance by people who do not want some people or objects to be recorded. For example, consider a kindergarten where most parents would like to install cameras to watch over their children, but a minority of parents do not approve of these cameras. The ability to create a redacted video, where the children of those disapproving parents are removed, could resolve this issue. In this context, redaction can mean the removal of selected objects that were recorded in the video, removal of sounds related to these objects, or removal of references to these objects from any meta-data related to this video, or to change the video and the sound such that the identity of objects cannot be recovered. The ability to create a redacted video as above could satisfy both those that want to install the cameras and those who do not want their children to be recorded in the video. In another example, cameras installed at homes may exclude from the recorded video the residents of this home. This will allow only recording of intruders and guests, while giving the home residents the privacy they want. In other examples, the redacted video may exclude people in indecent situations, exclude children, and the like.

In addition to removing objects from the original video, when cameras record also sound, it may also be desirable to remove specific sounds. One example is to remove the sounds associated with the removed objects. Another example is to remove human speech from the soundtrack of the video, while keeping other sounds, in order to avoid eavesdropping and wiretapping concerns. However, there may be other sounds that may be removed for different purposes. In some cases, it may be desirable to remove normal background sounds, like traffic or machinery sounds, in order to better hear the foreground sounds. In other cases, it may be required to remove only voices of children.

SUMMARY OF THE INVENTION

According to some embodiments of the present invention, a method of automatic video redaction is provided herein. The method may include the following steps: obtaining an input video; obtaining at least one prespecified object, being a visual or an acoustic object or a descriptor thereof; analyzing the input video, to detect a matched object, being an object having descriptors similar to the descriptors of the at least one prespecified object; and generating a redacted video, comprising the input video, by removing or replacing the matched objects therefrom.

According to other embodiments of the present invention, a system for automatic video redaction is provided herein, the system may include: a computer memory configured to: obtain an input video; obtain at least one prespecified object, being a visual or an acoustic object or a descriptor thereof; and a computer processor configured to: analyze the input video, to detect a matched object, being an object having descriptors similar to the descriptors of the at least one prespecified object; and generate a redacted video, comprising the input video, by removing or replacing the matched objects therefrom.

According to other embodiments of the present invention, a non-transitory computer readable medium for automatic video redaction, the computer readable medium may include a set of instructions that, when executed, cause at least one computer processor to: obtain an input video; obtain at least one prespecified object, being a visual or an acoustic object or a descriptor thereof; analyze the input video, to detect a matched object, being an object having descriptors similar to the descriptors of the at least one prespecified object; and generate a redacted video, comprising the input video, by removing or replacing the matched objects therefrom.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
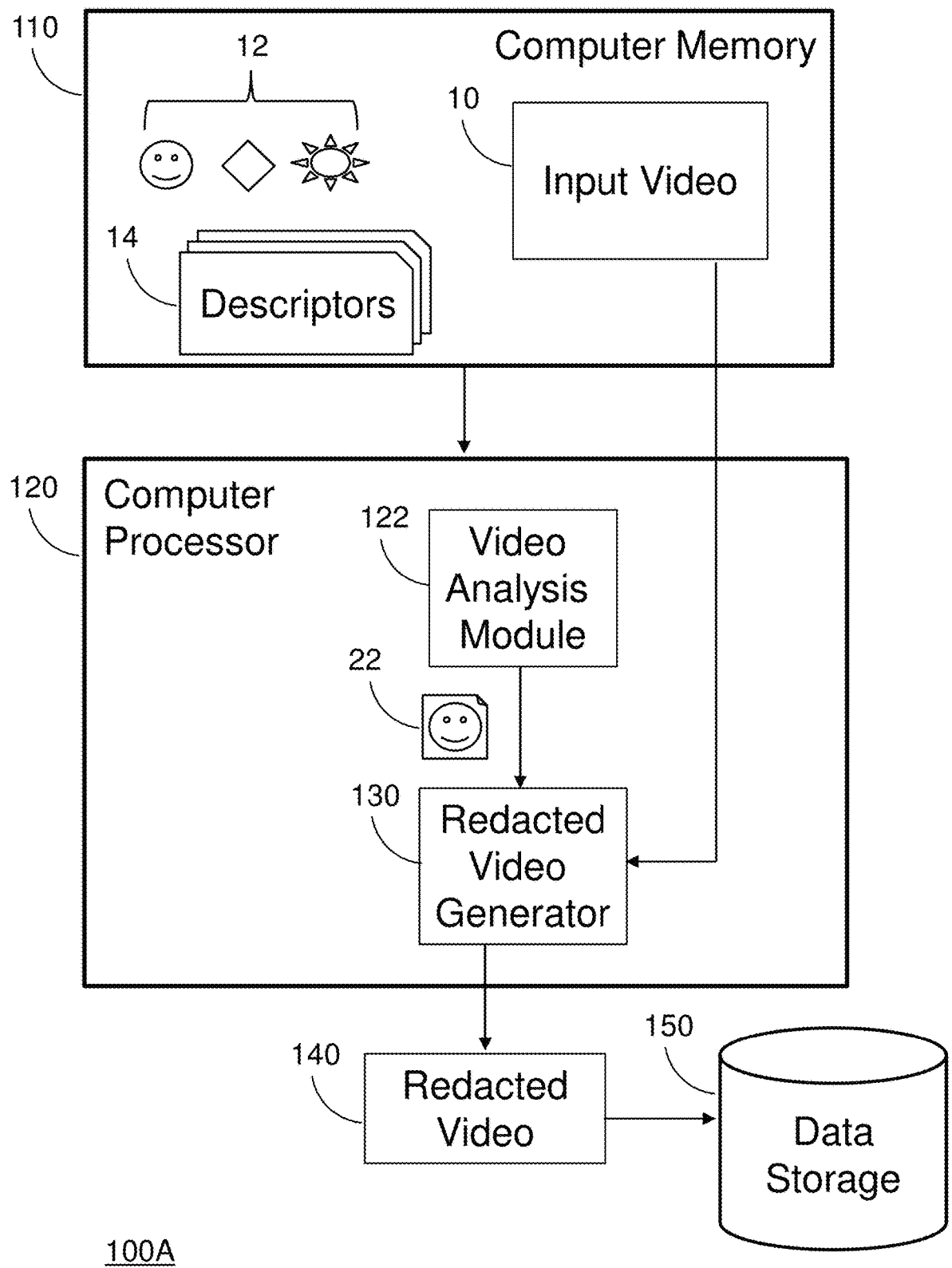
FIG. 1A is a block diagram illustrating non-limiting exemplary architecture of a system accordance with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1A is a block diagram illustrating a non-limiting exemplary architecture of a system 100A accordance with some embodiments of the present invention. System 100A for automatic video redaction may include: a computer memory 110 configured to obtain an input video 10 and further obtain at least one prespecified object 12, being a visual or an acoustic object or a descriptor 14 associated with objects. System 100A may further include a computer processor 120 configured to analyze the input video, possibly using a video analysis module 122, to detect at least one matched object 22, being an object having descriptors similar to the descriptors of the at least one prespecified object 12. Computer processor 120 may be further configured to generate a redacted video 130 which includes input video 10, by removing or replacing the at least one object 22 therefrom. System 100A may optionally include a data storage 150 configured to store redacted video 140.

Figure 1B:
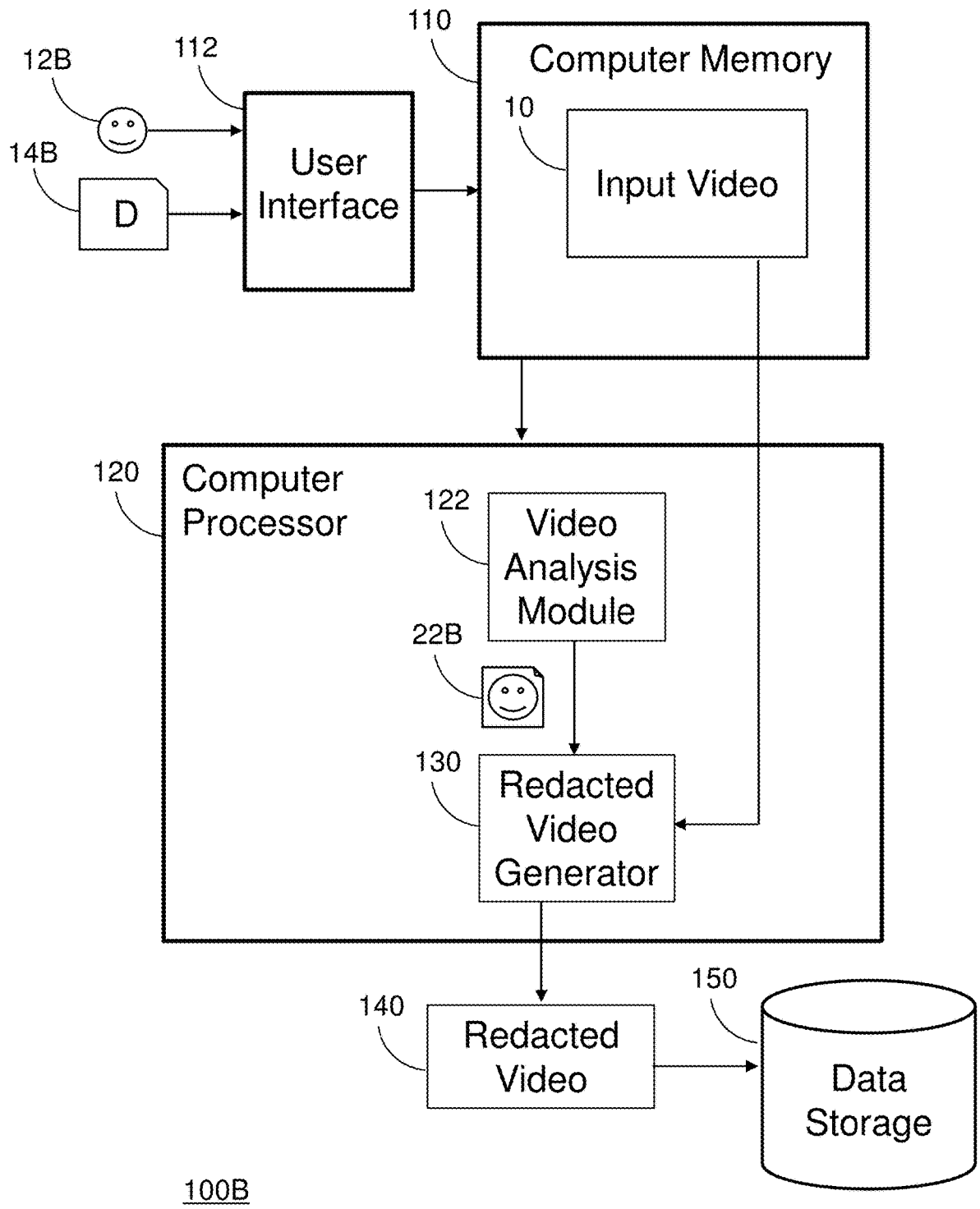
FIG. 1B is a block diagram illustrating non-limiting exemplary architecture of another system accordance with embodiments of the present invention.

FIG. 1B is a block diagram illustrating a non-limiting exemplary architecture of another system accordance with some embodiments of the present invention. System 100B for automatic video redaction, given a unique object, may include: a computer memory 110 configured to obtain an input video 10 and further obtain at least one unique object 12B, being a visual or an acoustic representation or incarnation of an object or a descriptor 14B associated with unique object 12B. System 100B may include a user interface 112 through which unique object 12B or descriptor 14B may be uploaded or obtained. System 100B may further include a computer processor 120 configured to analyze the input video, possibly using a video analysis module 122, to detect at least one matched object 22, being an object having at least one descriptor similar to the descriptors of the at least one unique object 12B. Computer processor 120 may be further configured to generate a redacted video 130 which includes input video 10, by removing or replacing the at least one object 22B therefrom. System 100B may optionally include a data storage 150 configured to store redacted video 140.

Figure 1C:
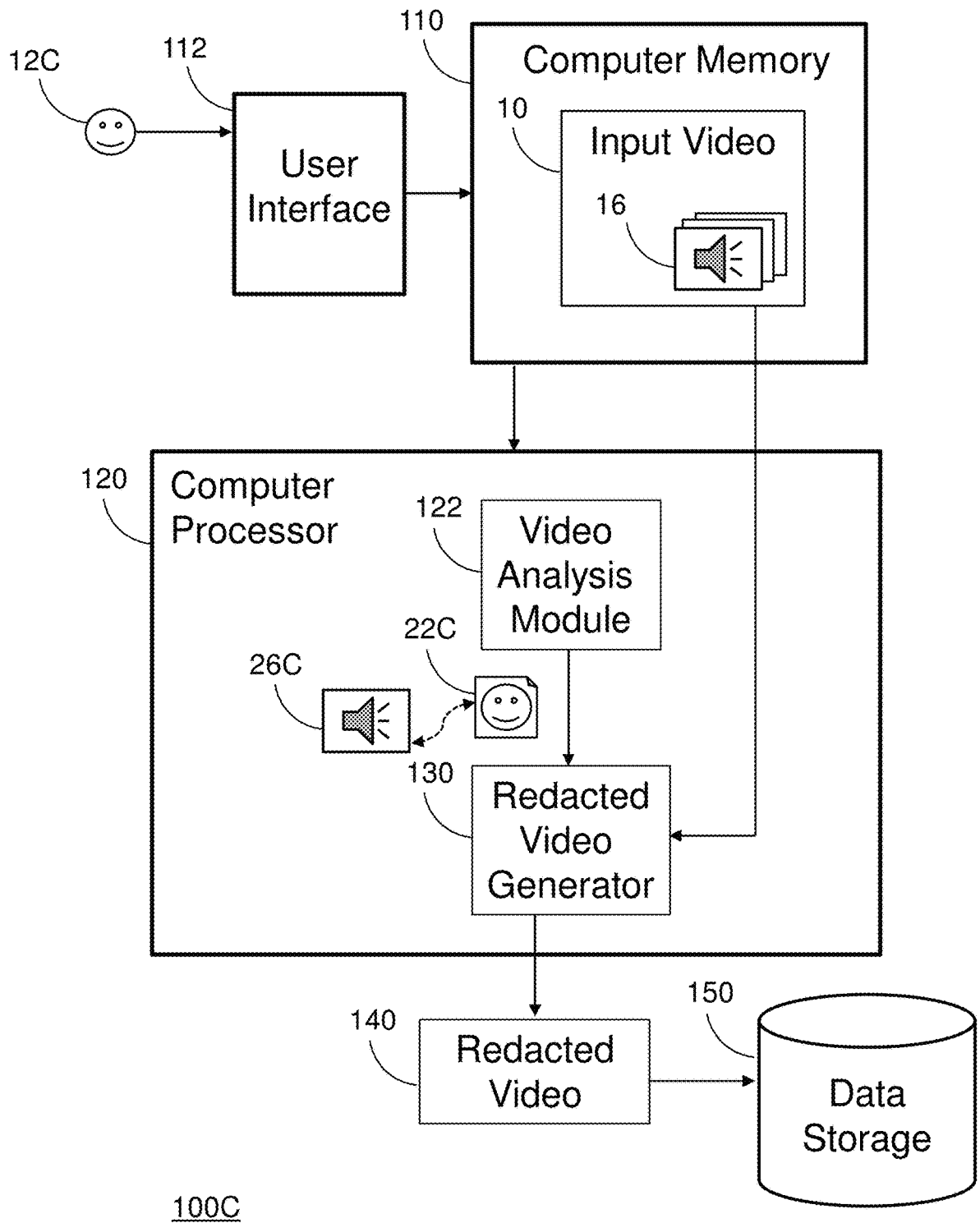
FIG. 1C is a block diagram illustrating non-limiting exemplary architecture of another system accordance with embodiments of the present invention.

FIG. 1C is a block diagram illustrating a non-limiting exemplary architecture of another system accordance with some embodiments of the present invention. System 100C for automatic video redaction, for removing specific sounds or acoustic portions from a soundtrack of an input video, may include: a computer memory 110 configured to obtain an input video 10 which includes a soundtrack 16 and further obtain at least one prespecified object 12C, being a visual or an acoustic object or a descriptor associated with an object. System 100C may further include a computer processor 120 configured to analyze the input video, possibly using a video analysis module 122, to detect at least one matched object 22C, containing at least a sound/acoustic portion 26C of the soundtrack, being associated with descriptors similar to the descriptors of the at least one prespecified object 12C. Computer processor 120 may be further configured to generate a redacted video 130 which includes input video 10, by removing or replacing the at least one object 22C and specifically sound/acoustic portion 26C of the soundtrack therefrom. System 100C may optionally include a data storage 150 configured to store redacted video 140.

Figure 1D:
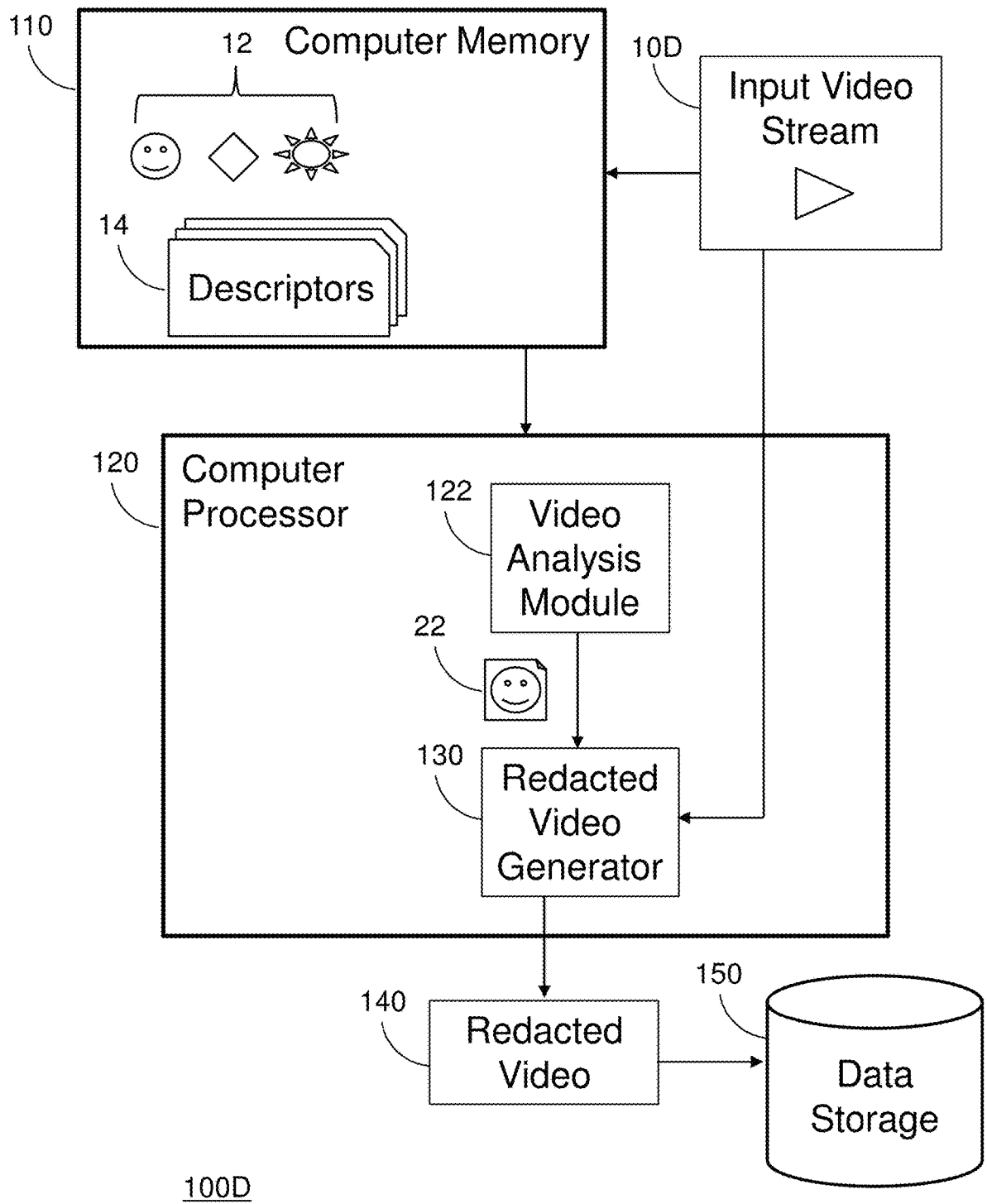
FIG. 1D is a block diagram illustrating non-limiting exemplary architecture of yet another system accordance with embodiments of the present invention.

FIG. 1D is a block diagram illustrating a non-limiting exemplary architecture of yet another system accordance with embodiments of the present invention. System 100D for automatic video redaction, for input video stream, may include: a computer memory 110 configured to obtain an input video stream 10D (being an endless video streamed continuously) and further obtain at least one prespecified object 12, being a visual or an acoustic object or a descriptor 14 associated with objects. System 100D may further include a computer processor 120 configured to analyze input video stream 10D, possibly using a video analysis module 122, to detect at least one matched object 22, being an object having descriptors similar to the descriptors of the at least one prespecified object 12. Computer processor 120 may be further configured to generate a redacted video 130 which includes input video stream 10D, by removing or replacing the at least one object 22 therefrom. System 100D may optionally include a data storage 150 configured to store redacted video 140.

Figure 2A:
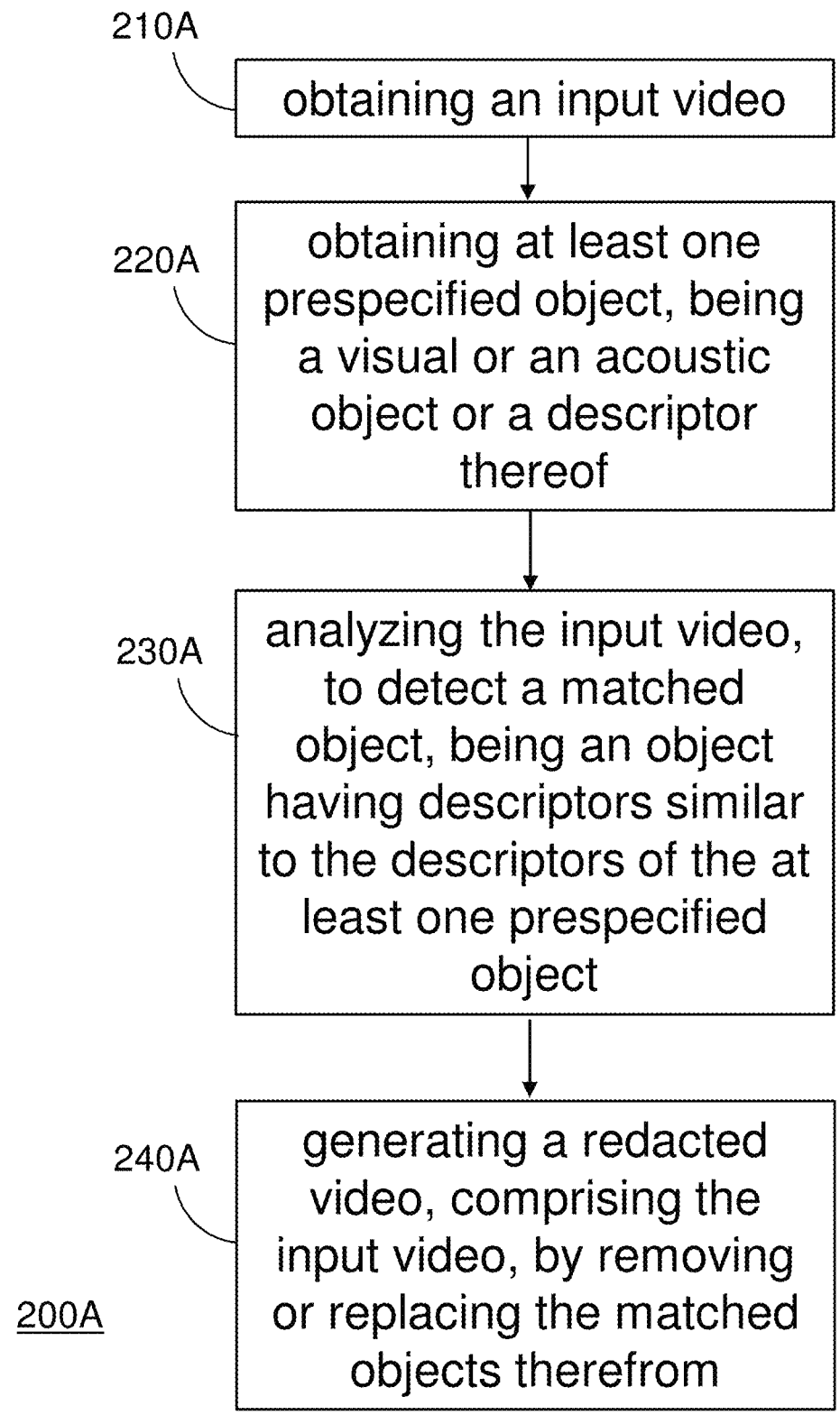
FIG. 2A is a high-level flowchart illustrating a non-limiting exemplary method in accordance with some embodiments of the present invention.

FIG. 2A is a high-level flowchart illustrating a non-limiting exemplary method in accordance with some embodiments of the present invention. Method 200A for automatic video redaction is provided herein. Method 200A may include the following steps: obtaining an input video 210; obtaining at least one prespecified object, being a visual or an acoustic object or a descriptor thereof 220; analyzing the input video, to detect a matched object, being an object having descriptors similar to the descriptors of the at least one prespecified object 230; and generating a redacted video, comprising the input video, by removing or replacing the matched objects therefrom 240.

Figure 2B:
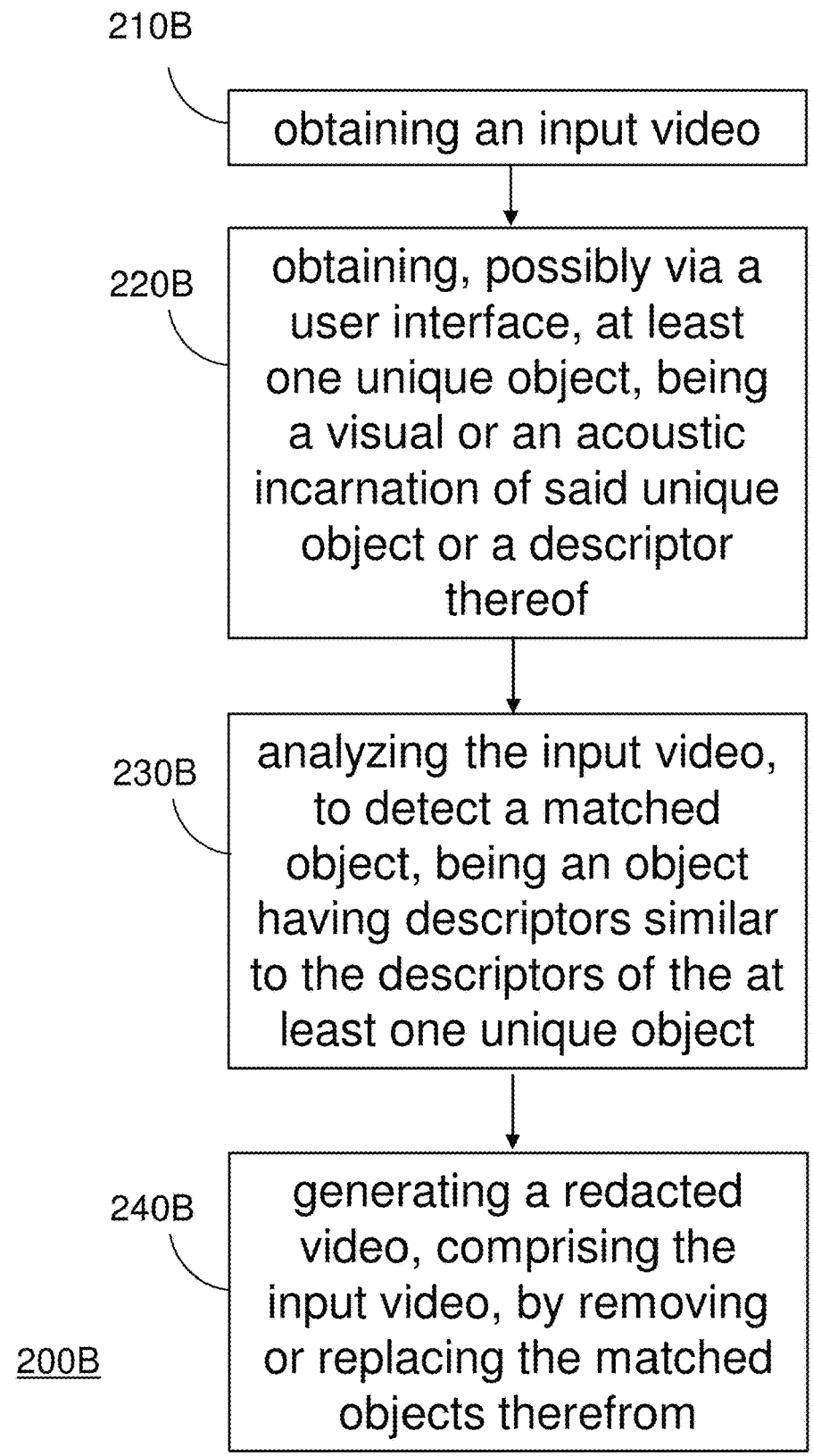
FIG. 2B is a high-level flowchart illustrating another non-limiting exemplary method in accordance with some embodiments of the present invention.

FIG. 2B is a high-level flowchart illustrating another non-limiting exemplary method in accordance with some embodiments of the present invention. Method 200B for automatic video redaction is provided herein. Method 200B may include the following steps: obtaining an input video 210B; obtaining, possibly via a user interface, at least one unique object, being a visual or an acoustic incarnation of said unique object or a descriptor thereof 220B; analyzing the input video, to detect a matched object, being an object having descriptors similar to the descriptors of the at least one unique object 230B; and generating a redacted video, comprising the input video, by removing or replacing the matched objects therefrom 240B.

Figure 2C:
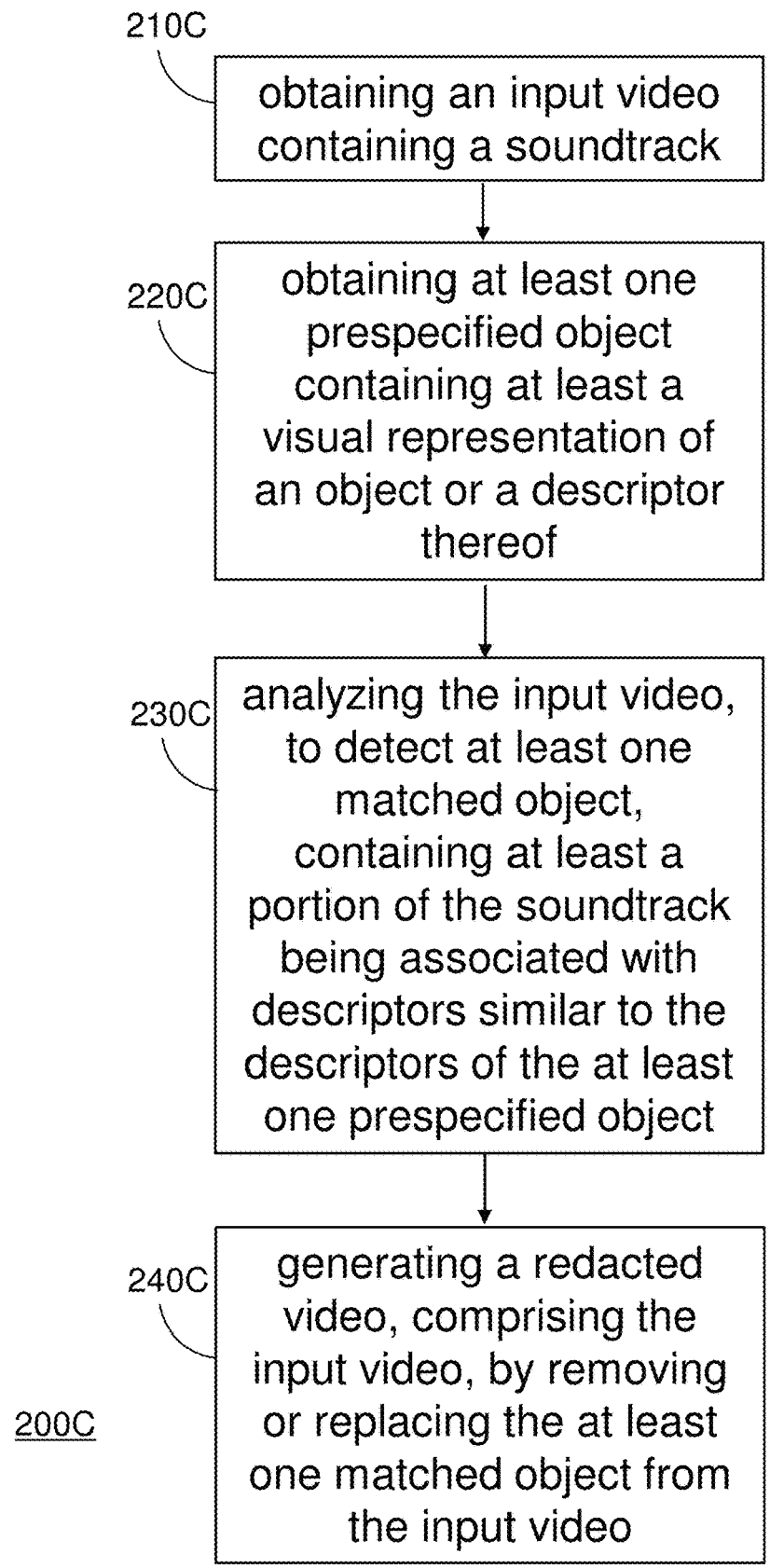
FIG. 2C is a high-level flowchart illustrating another non-limiting exemplary method in accordance with some embodiments of the present invention.

FIG. 2C is a high-level flowchart illustrating another non-limiting exemplary method in accordance with some embodiments of the present invention. Method 200C for automatic video redaction is provided herein. Method 200C may include the following steps: obtaining an input video containing a soundtrack 210C; obtaining at least one prespecified object, being a visual or an acoustic object or a descriptor thereof 220C; analyzing the input video, to detect at least one matched object, containing at least a portion of the soundtrack being associated with descriptors similar to the descriptors of the at least one prespecified object 230C; and generating a redacted video, comprising the input video, by removing or replacing the matched objects therefrom 240C.

Figure 2D:
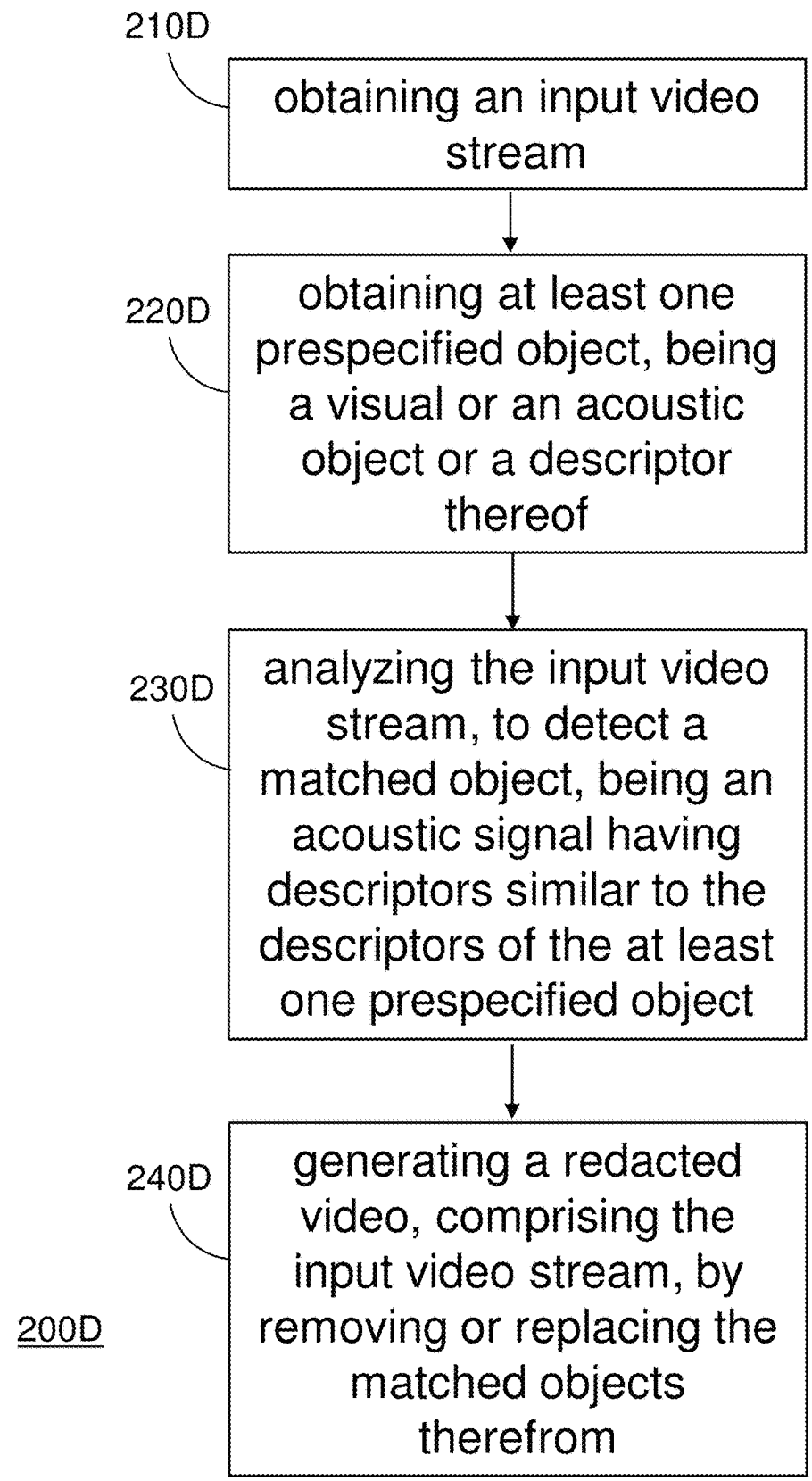
FIG. 2D is a high-level flowchart illustrating yet another non-limiting exemplary method in accordance with some embodiments of the present invention.

FIG. 2D is a high-level flowchart illustrating yet another non-limiting exemplary method in accordance with some embodiments of the present invention. Method 200D for automatic video redaction is provided herein. Method 200D may include the following steps: obtaining an input video 210D; obtaining, via a user interface, at least one unique object, being a visual or an acoustic incarnation of said unique object or a descriptor thereof 220D; analyzing the input video, to detect a matched object, being an object having descriptors similar to the descriptors of the at least one unique object 230D; and generating a redacted video, comprising the input video, by removing or replacing the matched objects therefrom 240D.

According to some embodiments of the present invention, the system can also be set up such that a person visible in the input video may be able to control the redaction process by making visual signs (like waving hands) or by making some sounds (clapping hands) or saying some predefined words. Such signals can serve as an input to the object or sound removal process and can also be used to train the system to recognize which objects or sounds to remove.

For the sake of simplicity, described herein in detail are objects that should be excluded from the redacted video. It is clear that it is also possible to do the opposite and describe only the objects that should be included in the redacted video. Objects that will not be similar to the included descriptions will be excluded. Also, the descriptions can include some objects to be excluded, and some objects to be included. In this case, an input object should be compared to the "include" descriptors, to the "exclude" descriptors, and the particular decision whether to include or to exclude this object will be determined by its similarities to the two different groups.

Object Extraction

According to some embodiments of the present invention, the task of removing selected objects from video can use a preliminary stage in which objects are detected and tracked in the original video. In some implementations, the scene background model can be learned and moving objects can be extracted by their difference from the background model. Such background subtraction methods are applicable as long as the recording camera is static. Other object detection methods, such as Faster-RCNN or SSD, can be applied over the input video frames, providing bounding box locations of the objects in the scene. Such methods can work also when the camera is moving, such as video from a handheld camera, vehicle mounted camera, or wearable cameras. Pixel level object masks can be computed using instance segmentation methods such as Mask-RCNN. These methods are applicable also for video frames recorded by a moving camera. Multiple object tracking methods can connect the detections of each individual object in different video frames, based on appearance and motion similarity. All previously described methods enable the computation of trajectories of scene objects. Each trajectory can be comprised from detections of an objects in a sequence of frames. At each frame, the object can be designated by some point on the object, or by a bounding box of the object, or by a pixel map forming a mask having the shape of the object in this frame. Any of the existing methods for background subtraction, moving object segmentation, and objects tracking, known by people skilled in the art, is possible. The result after applying these methods is a "tube" representing a single object: a sequence of locations of this object in successive video frames.

Object Description and Matching

Objects to be excluded from the redacted video should be described before the redaction takes place. This description can take several forms:

Giving one or more pictures or videos showing this object.

Giving descriptions of the objects, for example being a car or a person. Descriptions can even be more specific and include some specific attributes of a car (e.g. plate number, color, model), or some specific attributes of a person (e.g. gender, age, hair color and length, dress description and color, accessories, e.g. glasses, backpack, etc.).

Giving descriptors of objects that may not have clear semantic meaning such as descriptors generated by a descriptor generating process. e.g. a Neural Network.

According to some embodiments of the present invention, images, videos, and descriptions of excluded objects can be created from information available in advance. Alternatively, some information can be obtained by watching the recorded video or by being in the scene while it is being recorded and giving indications which objects should be excluded (or included) in the redacted video.

Given the above object descriptions, determining if the scene includes objects that match a certain description can be done in several ways. One approach is to use a detector to detect only the desired objects, such as a person detector if we wish to remove people, or a car detector if we wish to remove cars. Another approach is to detect a larger set of objects, and for each object detected in the input video, we can measure the similarity of its appearance, or the similarity of its description, or the similarity of its movements, to their appearance or features or movements as given. One example for computing similarity between objects is object re-identification known in the art. But many other methods exist for measuring similarity, known to every person skilled in computer vision.

According to some embodiments of the present invention, another approach is to give a set of descriptors representing the objects. The attributes of input objects can be extracted and compared to the attributes given in the object description. It should be mentioned that attributes do not necessarily have to be meaningful, and can also be attributes, extracted by a mathematical process, that have no direct meaning. Such attributes are extracted, for example, using neural networks. Attributes can also be from different modalities, e.g., can be sound attributes in addition to appearance attributes.

According to some embodiments of the present invention, the attributes of the objects extracted from the input video are compared to the given object description, and each matching object is marked as such. The similarity between the input object and the given description can either be binary (yes/no) or can be a continuous similarity measure describing the level of similarity. By way of a non-limiting example, "0" will indicate non-similar objects, "1" will indicate very similar objects, and values in between represent intermediate levels of similarity. This will allow addition of a confidence measure to the redaction process. For example, in one case we may wish to exclude only objects having a high similarity of "1", and in another case we may wish to exclude also objects having a lower similarity level, say of 0.5 and above.

This confidence measure can also be used when description is given for both "include" objects and "exclude" objects. In this case, an input object should be compared to the "include" descriptors, to the "exclude" descriptors, and the particular decision whether to include or to exclude this object will be determined by the certainties of its similarities to the two different groups.

Object Removal

According to some embodiments of the present invention, after detection of the input objects, the input objects are matched to the given object descriptors. Each object can be labeled as a matching object or a non-matching object. When the object descriptors describe objects to be excluded, at least one appearance of a matching object should be excluded from the redacted video. When the object descriptors describe objects to be included, matching objects should be included in the redacted video, and at least one appearance of a non-matching object should be excluded in the redacted video. Given the input video and the list of objects to be excluded in the redacted video, one possible process to create the redacted video is as described hereinafter.

According to some embodiments of the present invention, every frame is copied from the input video to the redacted video. During this process, each pixel in each frame is examined whether its location falls within the area of an excluded object in this frame. Pixels that are part of an excluded object will be marked as excluded. The color values at excluded pixels will not be the original color value, as we do not want the original object to be included. Instead, the color values are replaced. Replacing the color or each such pixel by some predetermined color is possible, making every object exclusion clearly noticeable. This may even be unpleasant to watch. Other possibilities to compute the color value for the excluded pixels include:

Replacing a Removed Object by a Background

According to some embodiments of the present invention, relevant "tubes" for exclusion can be replaced in the output video with background color values, taken from the background model, or with patches of related background taken from other frames. If desired, replacing background colors may be modified somewhat to differentiate them from true backgrounds. It should be noted that, in some cases, removed objects may occlude another moving foreground object. In this case, we do not want to replace the removed objects with a background, and instead the removed object may be replaced by a synthetically generated appearance of the occluded object. It is possible that the object removal process will eliminate the removed objects, many times not leaving a trace that will indicate that such an object existed.

Replacing Removed Object by an Icon

According to some embodiments of the present invention, excluded objects can be replaced with masks, for example an icon, which is a unique mask for each identity. For example, replace all occurrences of person A with green mask and all occurrences of person B with red mask. This method removes the actual identity of the masked persons, but still allow to understand all the actions which the "green person" did. Another option is to use a unique avatar instead of a mask.

Alternatively, all removed persons can be replaced by an icon representing a person, all removed cars will be replaced by a car icon, etc. This process will allow to see the existence of an object, but not its exact activity and its identity.

Degraded Image

According to some embodiments of the present invention, blurring, adding noise, contract reduction, or any other degradation, can be applied to the selected object or parts of it. The degraded object is inserted into the redacted video instead of the original appearance of this object.

Sound Analysis

According to some embodiments of the present invention, video redaction can also be done on the soundtrack, when a soundtrack is included in the original video. Examples for possible sound analysis modules that can be used in this system are Speaker Recognition, Speech recognition, and Sound Classification. These modules can provide one or more of the following information: (1) in case of speech, the speaker's identity or a feature vector from intermediate levels of the speaker recognition network; (2) a speech transcript generated from the recorded speech, or a feature vector of intermediate levels from the speech recognition system; (3) the scene activity classification as computed from the recorded sounds; or (4) a feature vector of intermediate levels from the sound classification system.

According to some embodiments of the present invention, sounds and objects to be removed can be identified either by a particular activity of the source, e.g. vehicle sound, or the voice of a certain person, or by listening to spoken sounds by a user and following a predefined action. For example, a certain sound or word or sentence spoken heard by the microphone can stop recording for a certain period or remove certain sounds or objects.

Sound Removal

According to some embodiments of the present invention, once a sound that should be removed has been detected, it should be removed from the soundtrack. This can be done using traditional sound processing methods, building filters that remove the desired sounds, and the like.

Figure 3:
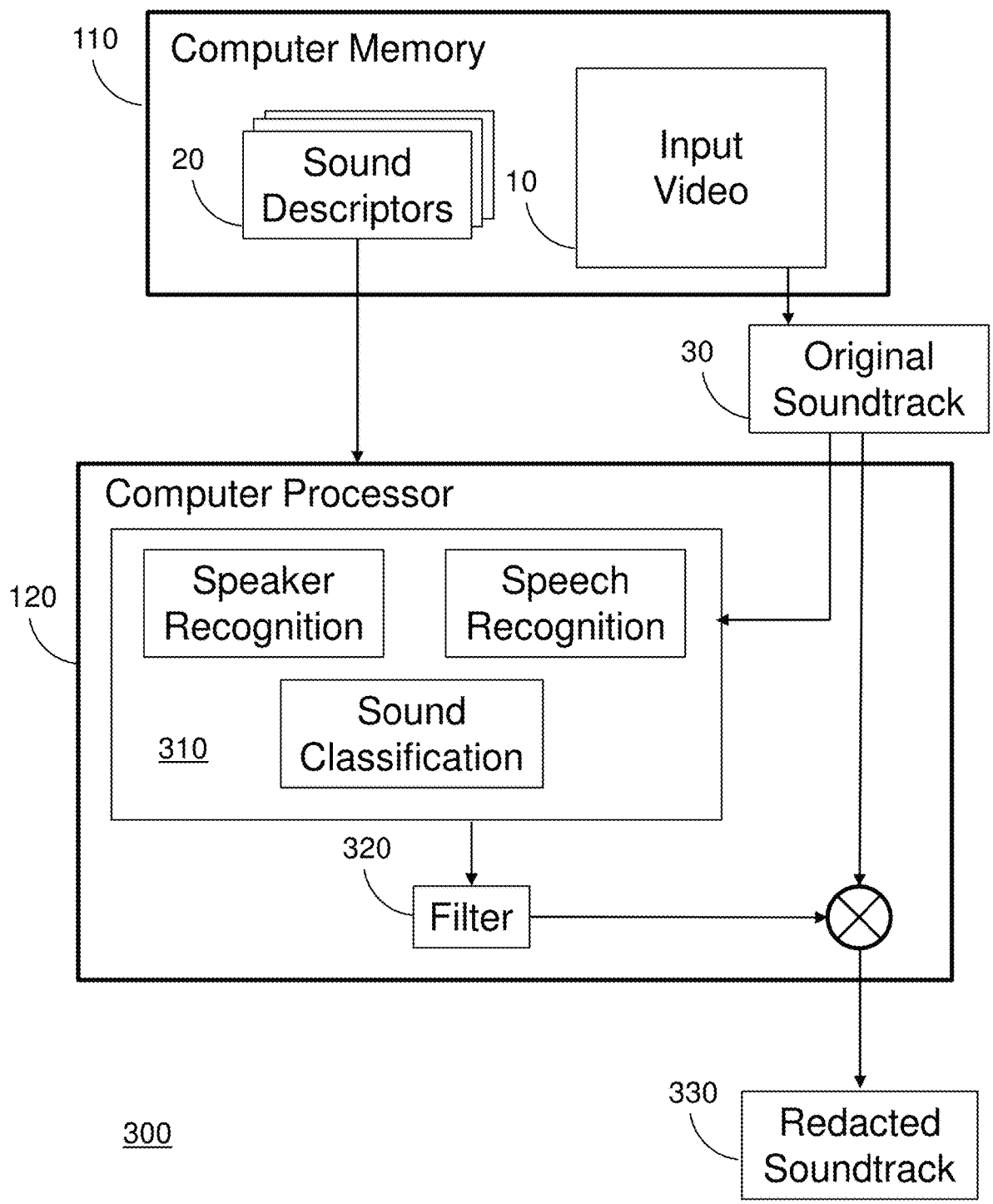
FIG. 3 is a block diagram illustrating non-limiting exemplary architecture of yet another system accordance with some embodiments of the present invention.

FIG. 3 is a block diagram illustrating a non-limiting exemplary architecture of system implementing sound removal in accordance with some embodiments of the present invention. System 300 may include a computer memory 110 configured to obtain a video 10 and sound descriptors 20 indicating sounds that need to be removed from the video. System 300 may include a computer processor 120 configured to obtain the original soundtrack 30 of video 10 and to apply one or more sound analysis modules 310 which may include speaker recognition, speech recognition, and sound classification. The output of sound analysis modules 310 may be used to generate a filter 320 that, when applied to the original soundtrack 30 and the sounds or speech that has been detected by sound analysis modules 310, and when based on sound descriptors 20, are removed, resulting in a redacted soundtrack 330 that does not contain the undesirable sounds or speech.

Operative Options

According to some embodiments of the present invention, after the proposed process, we have two videos: (i) the original video and (ii) the redacted video missing some selected objects or selected sounds. Following this stage, several options are possible:

The input video is removed and is not recorded in a long-term storage.

Both input and redacted videos are recorded, but access to the input video is given only to higher authorities (e.g., by a court order, etc.). One possibility is that the redacted video will be available to a large group of users, while the original video could be accessed by a smaller group of privileged users.

Many video analytics software generate metadata including the set of detected objects or the sounds. In such cases, it is possible to create a redacted metadata where the set of objects does not include the excluded objects, and the sound features will not include the features of the removed sounds.

Some embodiments of the present invention include cover video analytics processes that, instead of being applied on the input video, will be applied on the redacted video. For example, video synopsis can be applied on the redacted video, showing only non-excluded objects. When this is done, the step of the generation of the redacted video may be skipped, if only the analytics products are needed.

This invention covers all kinds of video, and, while the examples are given from surveillance video, it can also cover any other video, such as video recorded by wearable cameras.

Some embodiments of the present invention are not limited to the removal of objects by cropping the input video in space and/or in time, for example removing from the video all periods where a designated object is visible or heard or cropping frames to exclude regions where a designated object is visible. Such cropping, while it may remove the desired objects, will likely remove many other objects as well. Our invention aims at removing the desired objects, while keeping in the redacted video all other objects. In many cases, this goal cannot be achieved by temporal or spatial cropping.

Some embodiments of the present invention provide several useful applications that can be implemented in video recorded by a wearable camera, and in particular applications that use both the audio and the visual information in the recorded video.

Audio-Visual Analysis of Video from Surveillance Cameras

According to some embodiments of the present invention, useful applications that can be implemented in video viewed by surveillance cameras have been provided, and in particular applications that use both the audio and the visual information in the video.

Many surveillance cameras have microphones, and, in that case, sound can be heard when watching the live video from these cameras. However, sound recording is prohibited in many localities under many circumstances, where regulations prohibit eavesdropping and wiretapping.

According to some embodiments of the present invention, it would be possible to equip surveillance cameras with facilities that could perform sound analysis in real time, and the results of this analysis will be transmitted or stored as metadata together with the video. This audio analysis could be performed on camera, at the video recording system, or anywhere between the camera and the video recorder. This will enable video indexing and situation awareness based on sound meta data together with the visual information.

According to some embodiments of the present invention, a non-exhaustive list of possible metadata that can be used: (1) a verbal transcript of a conversation; (2) the identities of people whose voices are heard; and (3) a feature vector generated by a Neural Network or any other voice processing system.

According to some embodiments of the present invention, many Network Video Recorder (NVR) systems that record video from surveillance cameras do not record the audio part due to legal restrictions on eavesdropping and wiretapping. However, sound information can have critical contributions to the understanding of the scene, and the understanding the activity occurring in the scene.

Some embodiments of the present invention suggest a method to use the benefits of the sound information, while avoiding the legal implications associated with wiretapping. This can be done by extracting, in real time, useful sound features, and only those features will be recorded as metadata together with the video. This metadata can later be used, either alone or together with the visual information, to understand the activities around the camera.

Following below are several useful features that can be extracted from the sound in the captured video.

Speech Analysis

According to some embodiments of the present invention, when a video from surveillance cameras include speech, speech recognition methods can be used to create a transcript. After such analysis, relevant dialogues can be found in the video based on queries. Also, speaker identification can be performed on heard voices. Queries can include the speaker's identity or the verbal contents of the conversations. Alerts can be initiated based on the identity of the speaker or the contents of the speech. Two cases are important in particular:

Performing speech recognition on the original or the cleaned voice of people seen in the video. A transcript of the spoken words can be generated, and these words can be stored as meta-data. With such a transcript, the video can be searched more efficiently, and alerts can be set for specific verbal content. Microphone array methods are possible as well.

A transcript of other voices heard in the soundtrack can be made, even if the speaking person is not visible. The transcript can be attached to a speech signature of a person, such as the one generated by a speaker recognition system, so that re-identification of other speech by same person can be done, either in same camera or in other cameras.

Person Recognition

Face recognition can recognize the people visible in the camera. In addition, person recognition through voice analysis can help improve face recognition results in cases of poor image quality, or for people not seen on camera but only heard on microphone.

Even when the heard voices cannot be recognized, the number of people heard can be estimated as stored in the metadata, and the speech signatures of the heard people can be stored for possible future matching with voices heard in other situations.

Audio-Visual Scene Understanding and Activity Recognition

Audio-visual event recognition using all modules-visible objects and sound, can increase the accuracy of the determination of the activity in the scene. As an example, running people, and passing cars or trucks, have characteristic sounds that can be used to improve activity recognition as computed from computer vision. Other events of interests that have characteristic sounds include road accidents, gunshots, blowing wind, falling rain, etc.

Audio-visual scene understanding can be performed, classifying the activities and objects visible and/or heard on the video. Some events may only be visible with no generated sound, such as a person drawing a gun. Other events can be audio only, such as a faraway gunshot or a blowing wind, and some events can combine both vision and sound analysis, such as crowd voices, traffic sounds, etc. The existence of such events and objects can be recorded as meta-data for possible video search.

Sound based metadata can be computed from sound classification methods. The meta data can either be the final classification achieved by such systems in the last level of the neural network, or a vector of activation levels at some intermediate levels of the network.

System Description

According to some embodiments of the present invention, the heart of the system is a meta-data module, which takes as input the sound information and generates metadata that can be used for scene analysis, either in real time or for later processing. Since the recording of voice may not be allowed, the sound analysis module can be installed as a component at the video camera or at the video recorder. The video camera will include both a video sensor that captures the video frames and at least one microphone that captures the sound.

Audio Metadata Module

According to some embodiments of the present invention, the audio metadata module will take as input the sound information generated by one or more microphones. This can be an analog sound directly from the microphone, or a digital sound after the sound sensor has been digitized and encoded. The module, implemented using a computing device and embedded software, will run several analysis modules on the sound.

According to some embodiments of the present invention, three sample modules can be Speaker Recognition, Speech recognition, and Sound Classification. This module can have as output one or more of the following: (1) the speaker's identity or a feature vector from intermediate levels of the speaker recognition network; (2) a speech transcript generated from the heard speech or a feature vector of intermediate levels from the speech recognition system; (3) the scene activity classification, or (4) a feature vector of intermediate levels from the sound classification system.

On-Camera System

According to some embodiments of the present invention, the camera may have a normal path that combines the audio and the frames, and encodes them into a regular video stream (e.g. H.264) that can be transmitted and played remotely. Alternatively, the camera may transmit a video stream consisting of the video frames only with no sound.

In addition to the above, the audio from the microphone will be sent to a local audio metadata module, which will generate the required meta-data, this metadata will be transmitted from the camera either as part of the video stream, or on a separate stream.

Network Video Recording (NVR) System

According to some embodiments of the present invention, the audio metadata system may also be installed at the Video recording system. In this case, it is assumed that the video camera transmits a video having both video frames and sound. This video, including both video frames and sound, will be received by the NVR. The NVR can extract the audio from the video stream and send it to the audio metadata module for processing. The NVR may store the video without the audio component but may also store the associated metadata generated from the sound.

Handling Speech in Audio Recording

One of the biggest issues in audio recording are the laws against eavesdropping and wiretapping. Because of these issues, many surveillance cameras do not have microphones, and even in those that do have microphones, the sound is not recorded together with the video.

One possible approach mentioned above to handle this issue is to compute features of the sound, e.g., using neural networks, and use or store these features as metadata instead of recording or transmitting the sound.

Another approach, described herein, is to leave the soundtrack as sound. However, in order to avoid eavesdropping and wiretapping, it is proposed to mask the speech in a way that the speech will not be intelligible, while the other interesting sounds could still be recognized. Such other interesting sounds include gunshots, shouting, breaking glass, accidents, and the like.

There are several ways to make voice unintelligible in a soundtrack:
   Perform voice activity detection on the soundtrack and erase the soundtrack in all periods when a human voice is detected. This activity will erase all sounds, both human voices and other sounds, in the periods that include a human voice.
   Remove people's voices from the soundtrack, while keeping other concurrent sounds. Most approaches describe methods to get a clean voice by removing background sounds. Other approaches were used to remove vocals from songs. Similar methods can be used to remove voice from the soundtrack. This approach will keep all sounds when no human voice is heard. In periods that include a human voice, only the human voice is removed, while keeping other sounds.
   Garble the sound in a way that human voice will become unintelligible, while features of other sounds could still be computed. This is possible because speech understanding requires long term tracking of sounds, while understanding of other sounds, like gunshots or accidents, is very local in time. One possible approach is dividing the sound into short segments in random and reordering these segments. Short term sounds like gunshots or breaking glass could be spotted, while understanding of complete words or sentences will be impossible.

Scene Understanding Using Sound Analysis in Surveillance Video

Powerful and simple indications to the classification and importance of an event can be derived from sound. A gunshot, breaking glass, yelling, crying-all can be classified from sound, and indicate activities that should be examined.

In locations covered by surveillance cameras, such as cities, airports, shops, and many more, only a few observers are watching the videos. In such cases, sounds can be important in determining important events, and in particular help determine which videos should be examined by the observers, generating appropriate alerts.

Unfortunately, due to eavesdropping, wiretapping, and privacy laws, many surveillance cameras are not equipped with microphones, and, even when microphones are available, their use is very limited. The possibility that the microphones will capture and record a conversation between people may risk some sound analysis activities to be considered illegal.

In order to improve the analysis of video footage obtained from surveillance cameras, it is proposed to equip most surveillance cameras with microphones, and, in order to abide by all legal restrictions, perform the following processing: (1) Separate the video frames from the soundtrack, and process and/or record a silent video. (2) Divide the sound into short temporal fragments of one second or less each. (3) Analyze the sound in each fragment, yielding features from which the type of sound can be derived, but the content of a conversation or the identity of speakers cannot be extracted. These features can be saved or further processed. The original sound fragments that include human voice, as detected by Voice Activity Detection, will be discarded. (4) Process the features computed in (3) to determine the types of sound: gunshot, breaking glass, yelling, crying, etc. It is possible that the features computed in (3) will include the final sound classification, in which case stage (4) can be skipped. (5) Use the results of the processing in (4) to improve scene understanding, provide alerts, and the like.

Emotion Recognition and Detection of Deceit

Methods exist for the determination of emotion from the voice and from the facial expressions of a person. Of particular interest is the determination of stress, which can be used as an indication for deception. A wearable camera records a video having both audio and video frames, and, therefore, the emotion of a person can be computed from both the frames showing the facial expression and the audio recording the voice.

In this patent application, we will refer to the wearer of a wearable camera as an "officer". It should be understood that this can be a police officer, any other first responder, or anyone else using a wearable camera. In addition, while we will mainly refer to the emotional state of stress, indication possible deceit, it should be understood than other emotional states can be computed such as happiness, sadness, and the like.

Emotion Computation using video from a wearable camera can be important in many cases. For example, on many occasions, officers use wearable cameras, and an officer can be given indications whether the person he talks to is telling the truth or is trying to deceive him.

While emotion computation is not foolproof, it can give the officer a tool to help him set his priorities during stressful and time sensitive situations.

Methods for determination of emotion and stress from facial expressions and from voice are known in the art. In some embodiments, computer methods may be introduced to use both the audio and the visual information in a video for deception detection in courtroom videos.

However, wearable video poses many more challenges compared to courtroom video, and will need the following additional steps in order to be effective:

Wearable video is very unstable, and stabilization of the camera motions will very likely be needed in addition to the face tracking done in stationary cameras.

The audio channel is very noisy, much noisier than the audio recorded in sterile environments like a courtroom. Methods for the separation of the voice of a visible speaker from the background noise are needed. While there exist noise cleaning methods that use the soundtrack only and do not use the video frames, in case the soundtrack includes multiple voices, it may be difficult to isolate the voice of the person of interest. In the case of a wearable camera, we may determine the face of the person of interest to be the face that is closest to the center of the frame most of the time and use audio-visual methods to clean the voice of that person.

It should be mentioned that multi-microphone methods exist for speech enhancement and recognition, using beamforming to direct the sensitivity of the microphones to a particular place in space. Video frames showing the face of a person of interest may help when the person of interest is visible. When the officer can wear additional microphones, either on the camera itself, or in other locations, such beamforming can be used in addition to single microphone methods.

Architecture

According to some embodiments of the present invention, a system for audio-visual determination of emotion in wearable cameras will have the following components: (1) A video capture device, capturing both audio and video frames. The method will be effective when the video camera captures both the video frame showing the face of the person of interest, as well as the soundtrack capturing the voice of this person. (2) An optional display unit, displaying the recorded video to the officer. This unit may have an optional pointing device such as a touch screen. (3) A storage unit to store the captured video. (4) An optional transmission unit to transmit the video to a remote server. (5) A software module, running on a local computing device or on a remote server, determining the emotion from captured video. (6) An indicator that can inform the officer, or any other person, of the computation results, e.g., whether the person of interest is telling the truth or may be deceiving, or any other emotional state of the person of interest.

Emotion Determination Component

According to some embodiments of the present invention, the software module (5) above may include the following components: (5.1) A video decoder, reading the video and placing it in memory. (5.2) An optional video stabilization component, stabilizing the effects of the unstable camera. (5.3) A face tracking module, extracting the face of the person of interest from the video. In case multiple faces are visible, this module will determine the person of interest. A possible approach can indicate the person of interest as the person whose face is closest to the center of the video frames most of the time. Alternatively, the largest face may be selected, as the largest face indicates that this person is closest to the camera. Alternatively, the officer can use the optional video display (2) to point to the person of interest using some pointing device such as a touch screen. (5.4) An optional voice cleaning module, separating the person's voice from the background noise. This module will preferably get as input both the tracked face and the soundtrack and will output a clean voice. Alternatively, the voice cleaning may be performed using the soundtrack only. (5.5) An emotion determination module, getting as input the tracked face and the clean voice, and determining the emotional status of the person of interest. It may be possible to combine modules 5.4 and 5.5 such that a combined module will perform both voice cleaning and emotion determination in an end-to-end fashion.

Deployment Options

Many wearable cameras used by officers are connected to a wearable computing device that controls additional functions such as radio communications. Some embodiments of the present invention can be installed as a software on such a computing device, already worn together with the camera. In such a case, the officer may get an indication in real time, maybe after a slight delay, of some emotional status of the person with whom the officer may be engaged. When the wearable camera does not have a computing device, several options are possible:

- Video can be transmitted to a central server. Video processing can be done on the server, and results can be transmitted back to the officer. This can be done either in real time, or maybe after some substantial delay, depending of the nature of the communications and the availability of the server.
- A wearable processing unit can be added to the first responder, such that computing will be done locally. Such computation may be done even when communications is down.

According to some embodiments of the present invention, in all cases it is possible that the video will only be recorded by the officer and processed later on a server after the video is uploaded to the server, either by wireless transmission from the field of by other methods when the officer gets back to the station.

Additional Applications for Wearable Cameras

According to some embodiments of the present invention, additional applications for wearable cameras are proposed. Some applications are possible for those cameras that have the functionality to determine the person of interest in the video as described in step 5.3 above and can perform noise cleaning to the voice of that person. Other functionalities are possible for any wearable camera. These functionalities can be performed in real time or at a later time, either locally or on a remote server:

Creating a Transcript of Heard Speech

When a video from wearable cameras include speech, speech recognition methods can be used to create a transcript according to some embodiments of the present invention. After such analysis, relevant dialogues can be found in the video based on queries that can include the speaker's identity or the contents of the conversations. Three cases are important in particular:

- Performing speech recognition on the original or cleaned voice of the person of interest, cleaning performed according to step 5.4. A transcript of the spoken words can be generated, and these words can be stored as meta-data. With such a transcript, the video can be searched more efficiently. Microphone array methods are possible as well.
- As the officer wearing the camera is known most of the time, methods can be trained in advance to clean also the officer's own voice, even though he/she is not visible on the video. A transcript of the officer words can also be prepared and stored as meta-data.
- Transcript can be made of other voices heard in the soundtrack, even if they are neither visible nor the voice of the officer. The transcript can be attached to a speech signature of a person, so that re-identification of more speech by same person can be done, either in same camera or in other situations.

Activity Recognition of Officer

According to some embodiments of the present invention, audio-visual recognition of the officer's activity can be performed. Methods to recognize the wearer activity based on camera motion and visible objects exist, as well as audio-visual event recognition. Using all modules—camera motion, visible objects, and sound—can increase the accuracy of the determination of the officer's activity. As an example, running, walking, horse riding, and driving a car have characteristic sounds that can be used to improve activity recognition as computed from camera motion visible in the video.

Audio-Visual Scene Understanding

According to some embodiments of the present invention, audio-visual scene understanding can be performed, classifying the activities and objects visible and/or heard on the video. Some events may be visible only, such as a person drawing a gun, other events can be audio only, such as a gunshot heard, and some events can combine both vision and sound analysis, such as someone playing a musical instrument. Audio-based scene analysis can be combined with the vision-based scene analysis. The existence of such events and objects can be recorded as meta-data for possible video search.

Audio-Visual People Recognition

According to some embodiments of the present invention, face recognition can recognize the people visible in the camera. In addition, person recognition through voice analysis can help improve face recognition in case of poor image quality, or for people not seen on camera but only heard on microphone. Even when the heard voices cannot be recognized, the number of people heard can be estimated as stored in the metadata, and the speech signature of the heard people can be stored for possible future matching with voices heard in other situations.

Correspondence with Surveillance Cameras

According to some embodiments of the present invention, it may be possible to perform correspondences between the wearable camera and surveillance cameras, static cameras or on drowns, possibly by computing their mutual geometry. This can give the following functionality:

- An officer can request to see a surveillance video showing his environment for a better understanding of the situation.
- A central control room will be able to select and view all videos, both surveillance and wearable, watching a desired activity, for better understanding of the situation.

Alerts

According to some embodiments of the present invention, the results of Scene Understanding and People Recognition discussed herein may be used for alerts, either to the officer wearing the camera or the central control room monitoring the situation.

Alerts can also be given to the officer based on information from other nearby wearable cameras or from nearby surveillance cameras, as will be found necessary by the control room. This can be done either by a decision of an operator, of some kind of a computerized control that will forward alerts to nearby cameras.

Legal Framework and Challenges.

The proposed technical solution needs to address various legal challenges administrated by the relevant law in force. By way of a non-limiting example, a legal opinion provided to the Applicant focusing on the relevant law in Israel teaches: "Two Israeli laws govern the matter. The first is the Wiretapping Law and the second is the Protection of Privacy Law. In the context of the Wiretapping Law, as long as each sound being processed is of short enough interval so as not to be intelligible as part of a conversation and as long as no recording is made of the sounds, the approach described below would not violate the Wiretapping Law. We do not believe that detecting the existence of a conversation and providing non-unique description of speakers such as gender, age and mental status violates the provisions of the Wiretapping Law. Further, since none of the data that will be collected can be used to identify a specific person, most of the provisions of the Protection of Privacy Law do not apply. However, the Israeli Privacy Protection Agency has opined that systems that provide sound surveillance should be subject to the same limitations as systems that provide confidential video surveillance. Since it is anticipated that the sound surveillance will be coupled with video surveillance, that should not add any additional level of regulation above the regulations already being fulfilled by the video surveillance systems."

Improved Scene Understanding

Improved scene understanding, using the sound analysis features as described in the previous section, can be used for the following:

Create sound-based alerts, e.g. for gunshots or breaking glass or yelling.

Display the relevant videos based on the generated alerts.

Combine information from multiple sources, either audio or video, for example, compute the location of a gunshot by analysis of the sound as recorded in several locations Even though this document discusses sound processing, we should remember that video processing can provide more information about the scene. The information from both the sound and the video can be combined to improve understanding. For example, a running person may not indicate a video as important, but this can change if a gunshot or breaking glass were heard as well in the soundtrack of this or a neighboring camera.

From Cameras to Video Analytics

The addition of legal audio analysis to surveillance cameras requires a collaboration between makers of cameras, VMS systems, and analytics. Such a collaboration can create an end-to-end ecosystem that will have much more accurate recognition of critical events, events that generate a unique sound (gunshots, breaking glass, yelling, and the like). In a few years from now, why should anyone installing a new video surveillance system consider a system that does not have audio analysis?

Technical Issues

In order to preserve privacy, no third party should gain access to the sound as it is communicated between the microphone and the processor performing the sound analysis. Such communication should be done using a secure channel or be encrypted if done over non-secure networks. This privacy protection should be in effect when the sound processing is performed inside the camera or in a remote location.

Locating Noise Pollutions

Advantageously, some embodiments of the present invention may enable municipalities or other authorities the ability to measure and track noise pollution. Together with the cameras, the sources of the noise pollution can be tracked. The source of the noise pollution may be a car with a defective exhaust system, people getting in or leaving a party and the like.

Possible Extensions

Anyone skilled in the art can recognize that sound descriptors are not limited to frequencies that can be heard by people but can be applied to all frequencies captured by the microphones. Such descriptors can be used to identify multiple possible events, such as identify vehicle type by sound of engine, detect gender and age of speakers, detect the language spoken, etc. Many sound generating events of any kind can be classified and recognized by appropriate sound descriptors. Of course, alerts can be generated when any sound is heard at hours that are supposed to be complete quiet, such as after working hours.

In addition, the proposed privacy preserving processing proposed in this document can be done either by stand-alone microphones, or by microphones that are providing the soundtrack to video cameras.

Some embodiments of the invention may be carried out by a computing system. For example, a processor, operatively connected to a memory holding data and software, code, or instructions, may be configured or programmed by the software, code or instructions to carry out embodiments of the present invention. More than one such processor or computing system may be use.

It should be noted that all methods according to some embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment", or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of automatic video redaction, the method comprising:
   receiving, an input video comprising a sequence of frames captured by a camera, wherein the input video comprises live video obtained directly from the camera, wherein recordation of the video directly from the camera is disabled;
   performing visual analysis of the input video, to detect portions of said frames of said input video in which one of a plurality of predefined objects or a descriptor thereof is detected;
   removing the input video by not recording the input video on a data storage device;
   generating a redacted input video by replacing said portions of said frames with new portions of another visual content; and
   recording the redacted input video on the data storage device,
   wherein the storage device is blocked from storing the input video and stores only the redacted input video,
   wherein said receiving the input video, said performing visual analysis of the input video, and said generating the redacted input video, are carried out by a computer processor, after the input video is captured by the camera and before the recording of the redacted input video on said data storage device, and
   wherein communication between the camera and the computer processor is carried out via a secure channel or in an encrypted format over a non-secure channel.

2. The method according to claim 1, wherein the predefined objects comprise persons or a part thereof.

3. The method according to claim 1, wherein the input video is an input video stream being streamed continuously.

4. The method according to claim 1, wherein the new portions of another visual content comprises a icon.

5. The method according to claim 1, wherein the new portions of another visual content comprises a degraded visual representation of the removed portions.

6. The method according to claim 1, wherein the new portions of another visual content comprises a background of the frames proximal to said replaced portions of the frames.

7. The method according to claim 1, wherein said visual analysis comprises determining a match between attributes of one of a plurality of predefined objects and objects extracted from the input video.

8. A system of automatic video redaction, the system comprising:
   a camera configured to capture an input video comprising a sequence of frames, wherein the input video comprises live video obtained directly from the camera, wherein recordation of the video directly from the camera is disabled;
   a computer processor configured to:
   perform visual analysis of the input video, to detect portions of said frames of said input video in which one of a plurality of predefined objects or a descriptor thereof is detected;
   remove the input video by not recording the input video on a data storage device;
   generate a redacted input video by replacing said portions of said frames with new portions of another visual content; and
   a data storage device which records the redacted input video,
   wherein the storage device is blocked from storing the input video and stores only the redacted input video,
   wherein said receiving the input video, said performing visual analysis of the input video, and said generating the redacted input video, are carried out by a computer processor, after the input video is captured by the camera and before the recording of the redacted input video on said data storage device, and
   wherein communication between the camera and the computer processor is carried out via a secure channel or in an encrypted format over a non-secure channel.

9. The system according to claim 8, wherein the predefined objects comprise persons or a part thereof.

10. The system according to claim 8, wherein the input video is an input video stream being streamed continuously.

11. The system according to claim 8, wherein the new portions of another visual content comprises a icon.

12. The system according to claim 8, wherein the new portions of another visual content comprises a degraded visual representation of the removed portions.

13. The system according to claim 8, wherein the new portions of another visual content comprises a background of the frames proximal to said replaced portions of the frames.

14. The system according to claim 7, wherein said visual analysis comprises determining a match between attributes of one of a plurality of predefined objects and objects extracted from the input video.

15. A non-transitory computer readable medium for automatic video redaction, the computer readable medium comprising a set of instructions that, when executed, cause at least one computer processor to:
- receive, an input video comprising a sequence of frames captured by a camera, wherein the input video comprises live video obtained directly from the camera, wherein recordation of the video directly from the camera is disabled;
- perform visual analysis of the input video, to detect portions of said frames of said input video in which one of a plurality of predefined objects or a descriptor thereof is detected;
- remove the input video by not recording the input video on a data storage device;
- generate a redacted input video by replacing said portions of said frames with new portions of another visual content; and
- record the redacted input video on the data storage device, wherein the storage device is blocked from storing the input video and stores only the redacted input video, wherein said receiving the input video, said performing visual analysis of the input video, and said generating the redacted input video, are carried out by the computer processor, after the input video is captured by the camera and before the recording of the redacted input video on said data storage device, and wherein communication between the camera and the computer processor is carried out via a secure channel or in an encrypted format over a non-secure channel.

16. The non-transitory computer readable medium according to claim 15, wherein the predefined objects comprise persons or a part thereof.

17. The non-transitory computer readable medium according to claim 15, wherein the input video is an input video stream being streamed continuously.

18. The non-transitory computer readable medium according to claim 15, wherein the new portions of another visual content comprises a icon.

19. The non-transitory computer readable medium according to claim 15, wherein the new portions of another visual content comprises a degraded visual representation of the removed portions.

20. The non-transitory computer readable medium according to claim 15, wherein said visual analysis comprises determining a match between attributes of one of a plurality of predefined objects and objects extracted from the input video.

* * * * *